Patented Oct. 17, 1950

2,526,078

UNITED STATES PATENT OFFICE 2,526,078

METHODS OF PREPARING REACTION PRODUCTS OF EPSILON-CAPROLACTAM AND A NITROGENOUS COMPOUND

Edward L. Kropa, Old Greenwich, and John J. Padbury, Stamford, Conn., assignors to American Cyanamid Company, New York, N. Y., a corporation of Maine No Drawing. Application April 19, 1948, Serial No. 21,854

8 Claims. (Cl. 260—78)

This invention relates broadly to the production of new and useful synthetic compositions. More particularly the invention is concerned with the preparation of reaction products of epsilon-caprolactam and a nitrogenous compound. The invention is directed specifically to the preparation of linear polymeric materials which are reaction products of (1) epsilon-caprolactam and (2) a compound represented by the general formula I 

where R represents a member of the class consisting of hydrogen, alkyl radicals and monohydroxyalkyl radicals, the ingredients of (1) and (2) being employed in the ratio of 1 mole (about 1 mole) of the former to not less than 1 mole (not less than about 1 mole) of the latter. Thus, the ingredients of (1) and (2) may be employed in the ratio of 1 mole of epsilon-caprolactam to from 1 to 20 moles (about 1 mole to about 20 moles) of a compound or mixture of compounds of the kind embraced by Formula I, e. g., ammonia (anhydrous ammonia), an alkylamine (monoalkylamine) such, for instance, as n-butylamine, n-decylamine, etc., a dialkylamine, for example, dihexylamine, dioctylamine, etc., an alkanolamine (monoalkanolamine) such, for instance, as ethanolamine, isopropanolamine, etc., a dialkanolamine, for example, diethanolamine, di-n-butanolamine, etc. The preferred linear polymeric material obtained by practicing our invention are those which are composed substantially completely of the above reaction products and which have an average molecular weight of not more than 2000, more particularly an average ranging from a little above 2 (e. g., 2.5), generally at least 3 or 4 (at least about 3 or 4), to 16 (about 16) caprolactam units per molecule.

The radicals represented by R in Formula I may be any alkyl radical or any monohydroxyalkyl radical, and they may be the same or different. Illustrative examples of alkyl radicals which R in this formula may represent are: methyl, ethyl, propyl, isopropyl, n-butyl, isobutyl, sec.-butyl, tert.-butyl, amyl, hexyl, heptyl, octyl, nonyl, decyl to octadecyl, inclusive, including cycloalkyl (e. g., cyclohexyl, etc.). Illustrative examples of monohydroxyalkyl radicals which R in Formula I may represent are: monohydroxymethyl, -ethyl, -propyl, -isopropyl, -n-butyl, -isobutyl, -sec.-butyl, -tert.-butyl, -amyl, -hexyl, -heptyl, -octyl, -nonyl, -decyl to -octadecyl, inclusive, including monohydroxycycloalkyl (e. g., monohydroxycyclohexyl, etc.).

It was suggested prior to our invention that epsilon-caprolactam be polymerized alone or in the presence of a small amount of a polymerization catalyst at a temperature above 180° C., more particularly at a temperature within the range of 180° C. to 250° C., until a polymerization product was obtained which could be continuously spun from a melt into uniform threads. When a polymerization catalyst was employed, it was used in an amount corresponding to not more than 1/50 equivalent calculated on the monomeric lactam, specifically from 1/100 to 1/200 equivalent based on the starting lactam. Water, lithium chloride, zinc chloride, benzyl alcohol, dodecyl alcohol, benzyl amine, octadecylamine, guanidine carbonate, toluenesulfonic acid, potassium carbazole, benzyl chloride and phenol esters of carboxylic acids were among the polymerization catalysts suggested for this purpose. Such polymerization products are hard, horn-like materials, with average molecular weights such that the products can be drawn into fibers, that is to say, with average molecular weights substantially above 10,000, e. g., 15,000 or 20,000 or even as high as 30,000 or more.

When epsilon-caprolactam is polymerized as above-described with the aid of a small amount of a polymerization catalyst, the polymerization can lead only to the production of high-molecular-weight polymers since there is not a sufficient amount of catalyst in the reaction mass to favor the formation of low-molecular-weight polymers. The following simple explanation is given in order to illustrate the principles involved in such a catalytic polymerization reaction:

If it be assumed that the polymerization of 100 molecules of monomeric epsilon-caprolactam is to be effected in the presence of 1 molecule of water as a polymerization catalyst, a giant polymer molecule having a molecular weight 100 times that of the monomeric epsilon-caprolactam theoretically would result; if two molecules of water were present, then each would react with 50 molecules of the monomer and a polymer having a molecular weight 50 times that of the monomeric epsilon-caprolactam theoretically would result. From this it will be seen that, generally speaking, in such catalytic polymerization reactions, the size of the polymer molecule is dependent, other factors being the same, upon the amount of polymerization catalyst which is present.

The present invention is based on our discovery that when epsilon-caprolactam and a compound of the kind embraced by Formula I are heated together at a temperature above 110° C. (about 110° C.) and below the temperature of decomposition of the polymeric reaction product which forms, using molar ratios such as have been mentioned in the first paragraph of this specification, products are obtained which are different in kind (as evidenced by their differences in properties) from those obtained when epsilon-caprolactam is polymerized in the presence of the same compound in catalytic amounts, that is to say, in amounts not exceeding 1/50 equivalent, specifically from 1/100 to 1/200 equivalent, based on the monomeric epsilon-caprolactam being polymerized. Instead of obtaining a simple (unpolymerized) reaction product as the main or only product of the reaction, as might be expected, a polymeric material in all cases is obtained; and instead of this polymer being a fiber-forming (capable of being drawn into fibers), high-molecular-weight (above 10,000 molecular weight) material, as further might be expected from the published information on the polymerization of epsilon-caprolactam, the polymerization reaction was surprisingly found to be an equilibrium reaction which never goes to completion and which yields only polymeric materials having non-fiber-forming characteristics, more particularly a mixture of linear polymers having an average molecular weight not higher than 2000 (about 2000), usually an average molecular weight win the range of 300 (about 300) or 350 (about 350) to 1000 (about 1000) or 1400 (about 1400). The intrinsic viscosities of our polymerized compositions, which generally are not higher than 0.35, are indicative of the non-fiber-forming characteristics of the material.

By effecting reaction between epsilon-caprolactam and a compound of the kind embraced by Formula I using at least about 1 mole of the latter for each mole of the epsilon-caprolactam, a relatively large proportion of the total number of molecules of caprolactam enters into the primary reaction. Many polymer chains apparently are started, with the result that all of the caprolactam that will react enters into the reaction before any individual polymer chain attains a great length.

Taking anhydrous ammonia as illustrative of the compound used as a co-reactant with epsilon-caprolactam, ordinarily it would be expected, as indicated hereinbefore, that when equivalent amounts (or with the ammonia in molecular excess) of these materials were caused to react together, the product would be epsilon-aminocaproamide [NH₂(CH₂)₅CONH₂]. Surprisingly, however, the product is essentially polymeric in nature, and we have not been able to isolate any pure epsilon-aminocaproamide from the reaction mass, although a small amount of the simple compound possibly may be formed along with the polymeric products. Unreacted caprolactam is always found in the reaction mass, even when large excesses of ammonia (or other compound of the kind embraced by Formula I) are used. It is probable that at the beginning of the reaction the ammonia and the epsilon-caprolactam react in stoichiometrical proportions, after which polymers of low molecular weight are produced.

The polymeric reaction products of our invention, as ordinarily produced, may be represented by the following structural formula:

II

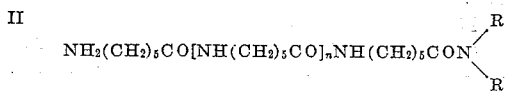

wherein $n$ represents a number between 1 and 16, that is to say, $n$ has an average value between 1 and 16, and R has the same meaning as given above with reference to Formula I. In all cases the initial reaction product comprises a mixture of polymers. The mixture may contain a small amount of the dimer of epsilon-aminocaproamide, in which case $n$ in the above formula would be 0. The crude reaction product containing a mixture of linear polymers may be fractionated, as shown by some of the examples which follow, by the use of particular solvents or mixtures of solvents, to obtain fractions in which the polymers are present within a narrower limit of molecular weights.

The temperature at which the reaction is effected between the epsilon-caprolactam and the ammonia or primary or secondary alkylamine or alkanolamine may be considerably varied, e. g., from about 110° C. to a temperature below the temperature of decomposition of the polymeric reaction product. Temperatures as high as 250° C. (about 250° C.) or 300° C. (about 300° C.) may be employed, if desired, but ordinarily the temperatures used are within the range of 125° C. (about 125° C.) to 225° C. (about 225° C.). The reaction proceeds rather slowly at temperatures of the order of 110° C. to 125° C., and hence temperatures of at least 140° C. (about 140° C.) or 150° C. (about 150° C.) generally are preferred.

In the case of ammonia or the lower boiling amines, the reaction is effected under autogeneous pressure. This pressure may vary, for example, from a few pounds per square inch to 5000 or more pounds per square inch depending, for instance, upon the molar ratio of ammonia or low-boiling amine to the epsilon-caprolactam and the free space in the autoclave. When the amine is such that it will not volatilize at the temperature of the reaction, then the reaction can be caused to take place at atmospheric pressure.

In some cases it may be desirable to effect the reaction between the reactants while they are dissolved or dispersed in a liquid solvent or dispersion media which is inert during the reaction. Examples of such liquid materials which may be employed are liquid or liquefiable hydrocarbons, e. g., benzene, toluene, xylene, petroleum ether, the various dialkyl ethers (e. g., dibutyl ether, diamyl ether, etc.), and the like.

The molar ratio of the reactants is important. The epsilon-caprolactam and the ammonia or primary or secondary alkylamine or alkanolamine should be employed in the ratio of 1 mole (about 1 mole) of the former to at least 1 mole (at least about 1 mole) of the latter, for instance in the ratio of 1 mole of epsilon-caprolactam to 1, 2, 3, 4, 5, 10 or even 15 or 20 or more moles of the latter. The maximum amount of the compound of the kind embraced by Formula I that is used is not critical. Any amount may be used, the maximum amount being governed only by practical considerations of economy in comparison with the results obtained by using the larger molar proportions.

At the end of the reaction period, which may range, for example, from 1 to 100 or more hours, the unreacted reactants are removed from the reaction mass by any suitable means, e. g., by distillation, by extraction with a solvent or a mixture of solvents, or by a combination of both such means. The unreacted material may be removed in conjunction with the removal of low-molecular-weight polymers, if desired. For some purposes, for example when the crude reaction product resulting from the reaction of epsilon-caprolactam and certain amines is to be reacted with an aldehyde, e. g., formaldehyde, to form an aldehyde-reaction product thereof which is useful as a resin or as a component of resinous compositions; it is not necessary to remove the unreacted starting materials from the crude reaction mass.

Any suitable solvent or mixture of solvents may be employed in purifying the crude reaction product. The reaction of the solvents is more or less selective. Ethanol is an efficient solvent for polymers ranging, for example, from dimers to pentamers, inclusive, but also has some solvent effect on hexamers and higher-molecular-weight species, its effectiveness decreasing with an increase in the molecular weight of the polymer. In general, a given volume of ethanol will dissolve more polymer and higher-molecular-weight species than the same volume of, for instance, diethyl ether. The latter is an efficient solvent for only relatively low-molecular-weight polymers, for instance, dimers and trimers. Obviously other alcohols and ethers similarly could be used in purifying the crude reaction product. Petroleum ether (B. P. 40°–60° C.) has been found to be an effective solvent for the removal of unreacted epsilon-caprolactam by continuous extraction, but has relatively little solvent effect on the polymers.

The polymerization products obtained by practicing our invention are normally solids which liquefy under heat. Depending upon the particular compound which is reacted with the epsilon-caprolactam and the extent, if any, to which the product has been purified, they vary from waxy or wax-like solids to fine powders or easily friable solids. Some of the products are soluble in hot water, in alcohol (ethyl alcohol), and in mixtures of alcohol and water, but are insoluble in benzene. In general, their intrinsic viscosities are relatively low, usually being within the range of 0.05 to 0.3 or 0.35. Products having intrinsic viscosities within the range of, for example, 0.05–0.1 to 0.2–0.25 are particularly useful, for instance, as plasticizers. (See Example 18 for a definition of intrinsic viscosity.)

The polymeric materials produced as herein described have a wide variety of applications, for example as intermediates in the formation of resins. Thus, they may be condensed with, for instance, aldehyde (e. g., formaldehyde, paraformaldehyde, acrolein, furfural, etc.) to yield new and valuable resinous compositions. They are particularly useful as plasticizers for thermosetting or potentially thermosetting resinous materials or molding compositions which normally have insufficient plasticity or flow characteristics. Thus, they may be used advantageously in forming plasticized resinous compositions as more fully described and specifically claimed in the copending application of Henry P. Wohnsiedler, Edward L. Kropa and Walter M. Thomas, Serial No. 21,856, filed concurrently herewith.

In order that those skilled in the art better may understand how the present invention may be carried into effect, the following examples are given by way of illustration and not by way of limitation. All parts and percentages are by weight unless otherwise stated.

EXAMPLE 1

| | Parts | Approx. Molar Ratio |
|---|---|---|
| Epsilon-caprolactam | 113 | 1 |
| Ethanolamine (monoethanolamine) | 61 | 1 | were heated together in a reaction vessel fitted with a reflux condenser and a gas-inlet tube extending to the bottom of the vessel. A slow stream of purified nitrogen was introduced through the tube while the reaction vessel was heated for 24 hours in an oil bath maintained at about 180° C., thereby maintaining the reaction mass under an inert atmosphere throughout the reaction period. The resulting linear polymeric reaction product was clear and almost colorless. The clear melt solidified upon cooling to room temperature.

The linear polymeric material prepared as above described may be used as a plasticizer in various applications, for instance in plasticizing acid-curing thermosetting or potentially thermosetting resinous materials or molding compositions which normally have insufficient or inadequate plasticity or flow characteristics. Or, the linear polymer itself may be used as an intermediate in forming resinous materials. For instance, the polymer and a dicarboxylic acid, e. g., adipic acid, sebacic acid, etc., may be caused to react together to form a resinous composition. This is illustrated in the following example.

EXAMPLE 2

To the reaction product of Example 1 was added 202 parts (approximately 1 mole) of recrystallized sebacic acid, and the vessel containing the reaction mass was placed in an oil bath which was maintained at a temperature of about 200° C. for about 2 hours. Thereafter the bath temperature was increased to about 210° C. and heating was continued at atmospheric pressure for an additional 19 hours. The reaction mass was kept under a nitrogen atmosphere throughout the heating period. The resulting reaction product, while hot, was a light amber-colored liquid. It did not crystallize upon cooling. When cooled to room temperature, it was very tough, somewhat rubbery and non-tacky. Further heating at an oil-bath temperature of about 230° C. for 24 hours at a pressure of less than 1 mm. yielded a resin which, upon being cooled to room temperature, was hard, tough and amber-colored. This resin became quite rubbery when heated to about 45° C. and very tacky upon further heating to about 80° C. The resin crystallized slowly after standing for several days at room temperature. It was insoluble in toluene and dioxane, slowly soluble in ethanol and readily soluble in ethylene chlorohydrin.

In a reaction between epsilon-caprolactam and ammonia in the ratio of 1 mole of the former to 1 mole (or more than 1 mole) of the latter, it generally would be expected, as has been mentioned hereinbefore, that epsilon-aminocaproamide would be produced in accordance with the following equation:

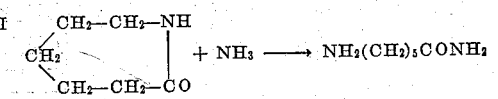

Surprisingly it was found that in all cases the reaction product is a mixture of relatively low-molecular-weight polymers (average molecular weight of less than 2000) and that it contains very little, if any, of the simple epsilon-aminocaproamide. This is illustrated by the results of the series of runs shown in Tables I and II. The reaction conditions are given in Table I and the characteristics of the products obtained, in Table II, All the runs with the exception of Run No. 236-25-58 (Example 5) were made in autoclaves fitted with glass liners. The liner containing the epsilon-caprolactam was cooled in solid carbon dioxide, liquid anhydrous ammonia was poured in in most runs, and the autoclave was assembeld. The autoclave was heated in an upright position without agitation. In some runs the ammonia was added from a transfer bomb. In the absence of a liner it was difficult to obtain a reaction product free from color.

At the end of the reaction period of the excess ammonia was vented off, leaving a white paste or a crumbly solid, depending upon the temperature and the amount of ammonia used. The solubility of the reaction product in 95% ethanol was checked and, if incompletely soluble, continuous extraction (Run No. 236-47-11; Example 9) in a Soxhlet extractor or digestion with alcohol was performed in order to separate the alcohol-insoluble fraction. In the 236-35- series of runs (Examples 3 to 7, inclusive) an attempt was made to remove unreacted epsilon-caprolactam by stirring the reaction product with approximately 5 times its weight of boiling hexane and repeating after decanting. Some of the products melted at this temperature (about 69° C.), forming a second liquid phase. It was found that this treatment did not effect complete removal of the unreacted epsilon-caprolactam; therefore, in the 236-47- series of runs (Examples 9 to 12, inclusive) the reaction products were extracted in a Soxhlet apparatus for about 5 to 6 hours, using petroleum ether (B. P. 40°-60° C.) as a solvent. The material extracted by the petroleum ether or by the hexane was mostly unreacted epsilon-caprolactam contaminated with small amounts of low-molecular-weight products of reaction. After extracting the petroleum-ether soluble components from the crude reaction products, followed by drying, the residues were light-colored, waxy solids with indefinite melting points. Most of them became quite fluid when heated to 100° C. Except as indicated in Table I, they were soluble in alcohol and hot water but insoluble in benzene. In several runs the crude reaction products were extracted with ethyl ether (diethyl ether), which removed considerably more material than did petroleum ether, and left a harder polymeric (linear polymeric) reaction product as a residue. In all runs, extractions were performed on separate portions of the crude reaction product.

The molecular weights (neutralization equivalents) given in Table II are average molecular weights of the particular product designated, and were determined by electrometric titration in aqueous ethanol. In calculating the molecular weights from titration results, it was assumed that the products were linear polymers represented by the structure IV.  $NH_2(CH_2)_5CO[NH(CH_2)_5CO]_nNH(CH_2)_5CONH_2$ and in which the only basic grouping was the terminal $-NH_2$ radical.

*Table I*

| Example | Run No. | ε-Caprolactam, Parts | Anhydrous NH₃, Parts | Approx. Molar Ratios (Moles NH₃ per Mole of ε-Caprolactam) | Temp., °C. | Time in Hours |
|---|---|---|---|---|---|---|
| 3 | 236-25-54 | 25 | 25 | 6.7 | 125 | 42 |
| 4 | 236-25-57 | 25 | 15 | 4.0 | 160 | 42 |
| 5 | 236-25-58 | 50 | 25 | 3.3 | 200-220 | 24 |
| 6 | 236-25-62 | 25 | 10 | 2.6 | 200 | 24 |
| 7 | 236-25-63 | 25 | 10 | 2.6 | 225 | 24 |
| 8 | 236-32-58 | 800 | 400 | 3.3 | 200 | 24 |
| 9 | 236-47-11 | 113 | 17 | 1.0 | 200 | 24 |
| 10 | 236-47-12 | 113 | 34 | 2.0 | 200 | 24 |
| 11 | 236-47-8 | 75 | 54 | 4.8 | 200 | 24 |
| 12 | 236-47-14 | 56.8 | 51 | 6.0 | ¹ 200 | 24 |

¹ During part of the reaction period the temperature was as high as 210° C.

*Table II*

| Example | Ethanol ¹ Insoluble, Per Cent | Non-Extractable by Diethyl Ether, Per Cent ¹ | Molecular Weight | Non-Extractable by Petroleum Ether or Hexane, Per Cent ¹ ² | Molecular Weight |
|---|---|---|---|---|---|
| 3 | 0 | | | About 10 | |
| 4 | 0 | | | About 80 | |
| 5 | 12 | | | | |
| 6 | 0 | | | About 80 | |
| 7 | 47 | | | | |
| 8 | Trace | | | About 70 | 408 |
| 9 | ³ 33.7 | | | 75.9 | 950 |
| 10 | 0 | 56.1 | 403 | 77.5 | ⁴ 398 |
| 11 | 0 | 45.7 | 340 | 70.2 | 385 |
| 12 | Some | 57.2 | | 72.4 | |

¹ Each extraction was performed on a different sample of the reaction product. The weight of the extracted product is compared to the weight of epsilon-caprolactam charged to the autoclave and, in calculating the percentage, no consideration is given to the amount of combined ammonia. Because of the molecular weight of the reaction product in each case as compared with that of ammonia, the true conversions would be only slightly less than the values recorded.

² The material extracted by the petroleum ether or hexane was largely unreacted epsilon-caprolactam. This was checked in several runs by melting point and mixed melting point determinations.

³ This ethanol-extracted material had a melting point of 185°-197° C. and showed 2.01% nitrogen when analyzed by the Van Slyke method. From the nitrogen analysis it was calculated that the product had an average molecular weight of about 1400.

⁴ Precipitation of a sample of the original reaction product from ethanol solution with benzene gave a 31% recovery of material having an average molecular weight of 555.

From an examination of the results of the runs summarized in Tables I and II it will be seen that the products of ammonolysis of epsilon-caprolactam are polymeric materials, even when large excesses of ammonia are used. In the case of those runs in which no alcohol-insoluble material was formed, the determination of the neutralization equivalent of the product obtained indicates that in each case it has a chain length which averages between 3 and 4 caprolactam units. The alcohol-insoluble products (Example 9) have a considerably higher molecular weight. The ammonolysis of epsilon-caprolactam is an equilibrium reaction, and in general it appears that about 20 to 30% of the epsilon-caprolactam does not react.

EXAMPLE 13

|  | Parts | Approx. Molar Ratio |
|---|---|---|
| Epsilon-caprolactam | 33.9 | 1.0 |
| n-Butylamine | 32.8 | 1.5 | were heated together for 24 hours at 200° C. in an autoclave equipped with a glass liner. The linear polymeric reaction product was a grey paste which was readily dispersible in hexane, but became gummy at the boiling point of the hexane. The entire reaction product was extracted in a Soxhlet extractor with petroleum ether (B. P. 40°–60° C.) for 6 hours. The petroleum ether was evaporated from the extract on a steam bath, the last traces of the ether being removed by distillation under a pressure of about 2 mm. at room temperature. The residue was a clear, brown, viscous oil. The yield of this residue amounted to 6.3 parts.

After drying in a vacuum desiccator over sulfuric acid for 2 days, the ether-extracted solid was a sticky brown mass having a neutralization equivalent of 286 (average of two determinations) as determined by electrometric titration of a sample in 30% aqueous ethanol. The yield of the extracted solid amounted to about 33.3 parts.

EXAMPLE 14

|  | Parts | Approx. Molar Ratio |
|---|---|---|
| Epsilon-caprolactam | 96.2 | 1 |
| n-Decylamine | 133.0 | 1 | were heated together with agitation under an atmosphere of carbon dioxide in a reaction vessel provided with a reflux condenser and a stirrer until complete solution had taken place. Thereafter heating reflux was continued for a total of 20½ hours at a temperature of 229°–263° C., the reaction mass being under a $CO_2$ atmosphere throughout the entire heating period. The hot, liquid reaction product cooled to a light yellow, fluid grease.

The apparatus was fitted up for vacuum distillation to remove volatile impurities in the crude reaction product. After removing about 50 cc. of colorless liquid (unreacted n-decylamine), which began to distill off at 71° C. at 1 mm. pressure, the liquid distilling over at a temperature up to about 190° C. at 1 mm. pressure began to solidify to a product, which was white to yellow in color and which presumably was mainly unreacted epsilon-caprolactam, and as such was deposited in various portions of the distillation apparatus and in the collection vessel. Thereafter the water in the condenser forming a part of the distillation equipment was allowed to get warm, and distillation was continued to a maximum temperature of 260° C. at 1 to 2 mm. pressure. At higher temperatures (above 210° C. at 1 mm. pressure) a yellow oil, which did not solidify, was collected. The residue in the reaction vessel solidified on cooling to a brown, waxy, linear polymeric product.

EXAMPLE 15

|  | Parts | Approx. Molar Ratio |
|---|---|---|
| Epsilon-caprolactam | 113.0 | 1 |
| Ethanolamine | 61.0 | 1 | were heated together with stirring under an atmosphere of carbon dioxide in a reaction vessel placed in a heated oil bath. The mixture was heated under reflux to the refluxing temperature (172° C.) of the mass over a period of 1 hour. The temperature was raised to 185° C. within the next 30 minutes and then to 190° C. in the following hour. After heating the mixed reactants for a total of 10 hours at a maximum temperature of 194° C., the reaction product was an amber-colored liquid when hot (at 194° C.). Upon cooling to room temperature the product was a yellowish white, waxy material having a melting point of the order of 90° to 110° C. The waxy solid was insoluble in cold water, but was dispersed in boiling water in oily form, yielding an opalescent emulsion. On cooling, the emulsified solid slowly settled from the water.

EXAMPLE 16

Essentially the same procedure was followed as described under Example 15 with the exception that the size of the batch was ten times as large, and the reaction temperatures and period of reaction were approximately as follows:

| Time | | Reaction Temperature, °C. | Reflux Temperature, °C. |
|---|---|---|---|
| Hours | Minutes | | |
| 1 | 45 | 186 | 146 |
| 4 | 15 | 191 | 154 |
| 7 | 45 | 189 | 138 |
| 10 | 15 | 185 | 136 |
| 12 | 30 | 183 | 135 |
| 14 |  | 182 | 133 |
| 20 |  | 180 |  |

The reaction product was an amber-colored liquid when hot and a yellowish white, waxy material at room temperature. About 25 grams of this product was digested with a mixture of 200 cc. of ethanol, 200 cc. of methyl ethyl ketone and 50 cc. of acetone on the steam bath until a finely divided precipitate settled out. The mixture was then cooled in an ice bath and filtered through a Büchner funnel to separate the solid material, which was washed with two 50 cc. portions of cold acetone. The pure white solid was air-dried in the Büchner funnel under suction. The dried material had a melting point of 165°–166° C.

Another portion (573 grams) of the yellowish white crude reaction product (A–1) was agitated in a refluxing mixture of 500 cc. of ethyl alcohol and 500 cc. of methyl ethyl ketone. After refluxing and agitating for 3 hours, the mixture was gradually cooled to room temperature and then agitated while the vessel containing the mixture was immersed in an ice bath. The precipitate was still waxy and difficult to filter. After adding 500 cc. of ethyl alcohol, 500 cc. of methyl ethyl ketone and 500 cc. of acetone, the mixture was again brought to reflux, cooled down to 45° C. and digested for about 16 hours. Since the mass still showed no signs of the settling of a precipitate, the vessel was placed in an ice bath and the mixture was agitated for 4 hours. It was then seeded with a small amount of the finely divided product formed by agitating some of the waxy material with warm methyl ketone. The solid particles in the mixture thereupon became filterable. The mixture was filtered by suction through a Büchner funnel, and the separated solid matter was washed with four 150 cc. portions of cold acetone. After air-drying the isolated solid, the product (A-2) was slightly waxy and yellow in color. Twenty grams of the air-dried, yellow product (A-2) was agitated with 100 cc. of water on the steam bath, but did not dissolve therein. Fifty cc. of alcohol was added, and the hot mixture was agitated until a clear solution, golden yellow in color, was obtained. This required agitation for only a few minutes. The solution was then cooled in an ice bath and 50 cc. of water was added slowly with agitation. The solution became turbid and a solid separated. The mixture was heated to yield a slightly opalescent solution and cooled down slowly to room temperature. Particles of moderate size settled out, were separated by filtration, and dried in a vacuum desiccator. The dried product (B) melted at 177°–179° C.

Another portion (20 grams) of the yellowish white crude reaction product (A-1) was mixed with 100 cc. of water and heated on the steam bath. The waxy material, which was broken up by agitation, did not dissolve in the water. Upon adding 50 cc. of ethyl alcohol, a clear solution was obtained. Fifty cc. of water was now added, and the solution was allowed to cool to room temperature. Fine, white particles slowly separated. The solid material was filtered off and dried in a vacuum desiccator. The melting point of the dried white powder (C) was 172°–173° C., and its intrinsic viscosity was 0.163, which was determined in this and other examples as described under Example 18.

Two hundred grams of the yellow product (A-2) was heated and stirred on the steam bath with 750 cc. of water. When the temperature of the mixture reached 60° C., 250 cc. of ethanol was added with stirring. Heating was continued until a clear, red solution was obtained. The solution was cooled to room temperature, whereupon a finely divided solid slowly separated, which was filtered off on a Büchner funnel, and washed with 100 cc. of acetone. The washed material was dried, yielding a tan-colored powder (D) which melted at 176°–178° C. The filtrate was a brown, fluorescent green, clear solution. When this solution was allowed to stand for about 16 hours at room temperature, a finely divided solid separated. These solid particles were filtered off, washed with acetone and dried to yield a light tan powder (E) which melted at 151–153° C. A Rast molecular weight determination on this product gave a value of about 1270, indicating that the linear polymer which had been isolated contained an average of approximately 11 caprolactam units.

EXAMPLE 17

|  | Parts | Approx. Molar Ratio |
|---|---|---|
| Epsilon-caprolactam | 1,017 | 1 |
| Ethanolamine | 550 | 1 | were heated together with stirring under an atmosphere of carbon dioxide in a reaction vessel placed in a heated oil bath. The reaction temperatures and period of reaction under reflux at atmospheric pressure were as follows:

| Time | | Reaction Temperature, °C. | Reflux Temperature, °C. |
|---|---|---|---|
| Hours | Minutes | | |
|  | 50 | 169 | 121 |
| 2 | 25 | 181 | 141 |
| 3 | 50 | 183 | 140 |
| 7 | 40 | 180 | 144 |
| 24 | 5 | 176 | 141 |
| 31 | 25 | 182 | 143 |

After heating under reflux for the above period a 75 cc. sample of the reaction product, which was liquid while hot and a yellowish white wax upon being cooled to room temperature, was removed. The crude reaction product (Sample A) was purified by recrystallization from alcohol and acetone, yielding a white powder having a melting point of 170°–173° C. and an intrinsic viscosity of 0.132.

The apparatus was fitted for distillation under vacuum, and heating was continued under reduced pressure. After heating for about 3½ hours more (total reaction time, about 35 hours) at a pressure which, for the most part, was between 2 and 5 mm. and at a gradually increasing temperature, about 320 cc. of high-boiling distillate (mostly unreacted ethanolamine) was collected. A 50 cc. sample of the crude reaction product (a yellowish white wax when cold) was purified as described above to yield a white powder having a melting point of 170°–173° C. and an intrinsic viscosity of 0.117.

The water condenser used with the vacuum-distillation apparatus was replaced by an air condenser, and heating under reduced pressure (2–5 mm.) was continued for an additional 6 hours (total reaction time, about 41 hours). A large amount of sublimed, unreacted epsilon-caprolactam was deposited in the distillation apparatus and in the receiving vessel. The hot reaction mass was now a clear, amber-colored liquid, which was light yellow in color when examined in thin layers. Upon cooling to room temperature, it was a brittle, yellow solid having a melting point of 178°–180° C. and an intrinsic viscosity of 0.262. Recrystallization of the crude material twice from alcohol and acetone yielded a light yellow powder which melted at 188°–193° C. and had an intrinsic viscosity of 0.316.

The material differences between the products of the methods of our invention and the products obtained by the polymerization of epsilon-caprolactam in the presence or absence of a polymerization catalyst are apparent from a comparison of the properties of the linear polymeric materials of the above examples with those of the following examples.

EXAMPLE 18

Epsilon-caprolactam (8 parts) was polymerized in a sealed glass tube, which had been evacuated prior to sealing to remove air, by heating for 93 hours at about 225° C. At the end of this period and at this temperature, the hot polymer was a transparent, viscous liquid. Upon cooling to room temperature, a hard, tough, opaque rod of polymer was produced. The product was soluble in m-cresol but completely insoluble in water, ethanol and diethyl ether.

A portion of the rod of polymer was cut into thin slices which were allowed to stand in m-cresol until solution was complete. The viscosity of the dilute solution (0.5 g. polymer per 100 cc. of solution) was determined at 25° C. The intrinsic viscosity of the use of the polymer was 1.06, the value being calculated from the following equation:

$$\text{Intrinsic viscosity} = \frac{\log_e n_r}{c}$$

wherein $n_r$ = viscosity of dilute solution of polymer in m-cresol divided by the viscosity of m-cresol in the same units at the same temperature; and $c$ = concentration of polymer in grams per 100 cc. of solution.

EXAMPLE 19

Essentially the same procedure was followed as described under Example 18 with the exception that a small amount of a polymerization catalyst, specifically octadecylamine hydrochloride, was incorporated into the epsilon-caprolactam. More particularly a mixture of 5 parts of epsilon-caprolactam and 0.068 part of octadecylamine hydrochloride, that is, in the ratio of 0.005 mole of the latter per mole of the former, were mixed together, sealed in a glass tube and heated for 72 hours at 222°–228° C. The resulting polymer, when cold, was a hard, tough, opaque rod. The intrinsic viscosity of this polymer was 0.93. It was soluble in m-cresol but insoluble in the same solvents mentioned under Example 18 with regard to the product of that example.

EXAMPLE 20

Same as Example 18 with the exception that a small amount of water was used as a polymerization catalyst, more particularly 0.011 part of water to 4 parts of epsilon-caprolactam, that is, in the ratio of 0.017 mole of water per mole of epsilon-caprolactam. A hard, tough, opaque rod of polymer having an intrinsic viscosity of 1.36 was obtained.

When three times as much water by weight was used for the same amount of episoln-caprolactam, the resulting polymer had an intrinsic viscosity of 1.00.

The products of this example were soluble in m-cresol but insoluble in water, ethanol and diethyl ether.

It will be understood, of course, by those skilled in the art that our invention is not limited to the particular alkylamines or alkanolamine or to the particular reaction conditions and processing technique given in the above illustrative examples. Thus, instead of n-butylamine, n-decylamine or ethanolamine (monoethanolamine), we may use any other primary or secondary amine of the kind embraced by Formula I, examples of which are listed below:

Methylamine (monomethylamine)
Dimethylamine
Ethylamine
Diethylamine
n-Propylamine
Di-n-propylamine
Butylamine
N-Ethylbutylamine ($C_2H_5NHC_4H_7$)
Dibutylamine
2-amino-4-methylpentane
    [$CH_3CHNH_2CH_2CH(CH_3)_2$]
n-Amylamine
Di-n-amylamine
Hexylamine
Dihexylamine
Heptylamine
Diheptylamine
Octylamine
Dioctylamine
Decylamine
Didecylamine
Octadecylamine
Dioctadecylamine
Diethanolamine
Propanolamine
Dipropanolamine
Isopropanolamine
Diisopropanolamine
n-Butanolamine
Di-n-butanolamine
Monoethanolmonopropanolamine
2-amino-4-pentanol
3-amino-3-methyl-2-butanol
2-amino-3-hexanol
3-amino-4-heptanol
3-amino-2-methyl-4-heptanol
3-amino-3-methyl-4-heptanol
5-amino-4-octanol Other examples will be apparent to those skilled in the art from Formula I and from the illustrative examples of radicals that R in the said formula may represent.

We claim:

1. The method which comprises effecting reaction at a temperature of at least 110° C. but below the decomposition temperature of the reaction product between reactants consisting of (1) epsilon-caprolactam and (2) a compound represented by the general formula

where R represents a member of the class consisting of hydrogen, alkyl radicals and monohydroxyalkyl radicals, the ingredients of (1) and (2) being employed in the ratio of 1 mole of the former to from 1 to 20 moles of the latter, allowing the reaction between the said reactants to proceed within the said temperature range until there has been produced a linear polymeric material having an average molecular weight of not more than 2000 and an intrinsic viscosity not higher than 0.35, and separating the unreacted substances from the said polymeric material.

2. A method of preparing a linear polymeric material which comprises effecting reaction at a temperature within the range of 125° C. to 250° C. between reactants consisting of epsilon-caprolactam and ammonia in the ratio of 1 mole of the former to from 1 to 20 moles of the latter, allowing the reaction between the said reactants to proceed within the said temperature range until there has been produced a linear polymeric material having an average molecular weight of not more than 2000 and an intrinsic viscosity not higher than 0.35, and separating the unreacted substances from the said linear polymeric material.

3. A method of preparing a linear polymeric material which comprises effecting reaction at a temperature within the range of 125° C. to 250° C. between reactants consisting of epsilon-caprolactam and a primary alkylamine in the ratio of 1 mole of the former to from 1 to 20 moles of the latter, allowing the reaction between the said reactants to proceed within the said temperature range until there has been produced a linear polymeric material having an average molecular weight of not more than 2000 and an intrinsic viscosity not higher than 0.35, and separating the unreacted substances from the said linear polymeric material.

4. A method as in claim 3 wherein the primary alkylamine is monodecylamine.

5. A method as in claim 3 wherein the primary alkylamine is mono-n-butylamine.

6. A method of preparing a linear polymeric material which comprises effecting reaction at a temperature within the range of 125° C. to 250° C. between reactants consisting of epsilon-caprolactam and a primary alkanolamine in the ratio of 1 mole of the former to from 1 to 20 moles of the latter, allowing the reaction between the said reactants to proceed within the said temperature range until there has been produced a linear polymeric material having an average molecular weight of not more than 2000 and an intrinsic viscosity not higher than 0.35, and separating the unreacted substances from the said linear polymeric material.

7. A method as in claim 6 wherein the primary alkanolamine is monoethanolamine.

8. A method of preparing a linear polymeric material which comprises effecting reaction at a temperature within the range of 125° C. to 250° C. between reactants consisting of epsilon-caprolactam and ammonia in the ratio of 1 mole of the former to not less than 1 mole but not more than approximately 6.7 moles of the latter, allowing the reaction between the said reactants to proceed within the said temperature range for a period of from 24 to 42 hours, and removing unreacted ammonia and epsilon-caprolactam from the reaction mass, the residue being the desired linear polymeric material.

EDWARD L. KROPA.
JOHN J. PADBURY.

REFERENCES CITED

The following references are of record in the file of this patent:

UNITED STATES PATENTS

| Number | Name | Date |
|---|---|---|
| 2,174,527 | Peterson | Oct. 3, 1939 |
| 2,264,293 | Brubaker | Dec. 2, 1941 |
| 2,333,639 | Christ et al. | Nov. 9, 1943 |
| 2,466,854 | Koch | Apr. 12, 1949 |